United States Patent [19]

Gunn

[11] Patent Number: 4,802,810

[45] Date of Patent: Feb. 7, 1989

[54] APPARATUS FOR UNLOADING CONTAINERS

[75] Inventor: Erwin T. Gunn, Seattle, Wash.

[73] Assignee: The Boeing Company, Seattle, Wash.

[21] Appl. No.: 100,735

[22] Filed: Sep. 24, 1987

[51] Int. Cl.[4] .................................................. B65G 65/23
[52] U.S. Cl. ...................................... 414/414; 414/421; 414/796.7
[58] Field of Search ............... 414/414, 495, 419–421, 414/471, 114, 118; 298/11

[56] References Cited

U.S. PATENT DOCUMENTS

| | | | |
|---|---|---|---|
| 2,935,218 | 5/1960 | Fritz | 414/495 |
| 3,220,698 | 11/1965 | Carder | 414/495 X |
| 3,341,042 | 9/1967 | Carder | 414/495 X |
| 3,602,383 | 8/1971 | Howat | 414/414 |
| 3,651,967 | 3/1972 | Rooke et al. | 414/414 |
| 3,695,462 | 10/1972 | Sullivan | 414/414 X |
| 3,717,270 | 2/1973 | Rooke et al. | 414/414 |
| 3,863,781 | 2/1975 | Butzow et al. | 414/414 X |
| 3,994,405 | 11/1976 | Krivec | 414/414 X |

Primary Examiner—Robert J. Spar
Assistant Examiner—David A. Bucci
Attorney, Agent, or Firm—Joan H. Pauly

[57] ABSTRACT

A frame (22) is pivotably mounted to a fixed support (14) below the frame (22). The frame (22) has a horizontal base (24) and a vertical restraining wall (28). A roller table (36) is mounted on and parallel to the base (24). A baggage container (2) is positioned on the table (36) with a side opening (4) adjacent to and covered by the restraining wall (28). The frame (22), table (36), and container (2) are pivoted into an inclined position in which the opening (4) faces generally downwardly. Two scissor links (42) disposed between the base (24) and the table (36) are operated to raise the table (36) and container (2) relative to the frame (22). This progressively uncovers the opening (4) to allow pieces of luggage (8) to move out of the container (2) and onto a chute (94).

19 Claims, 5 Drawing Sheets

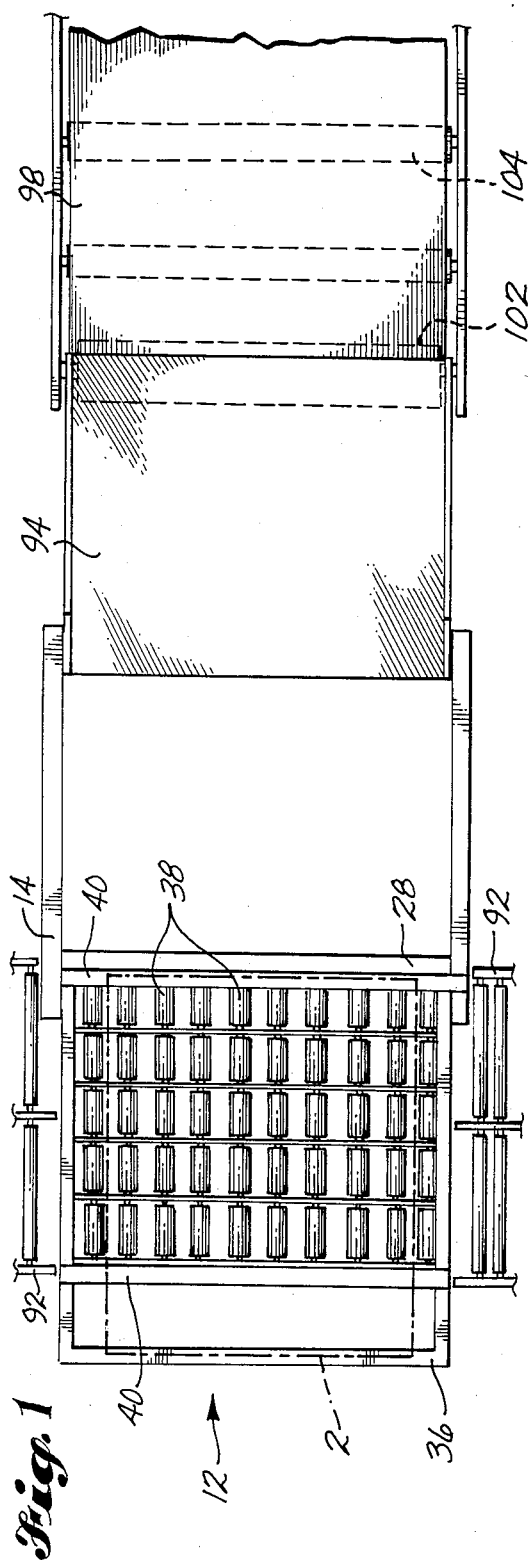
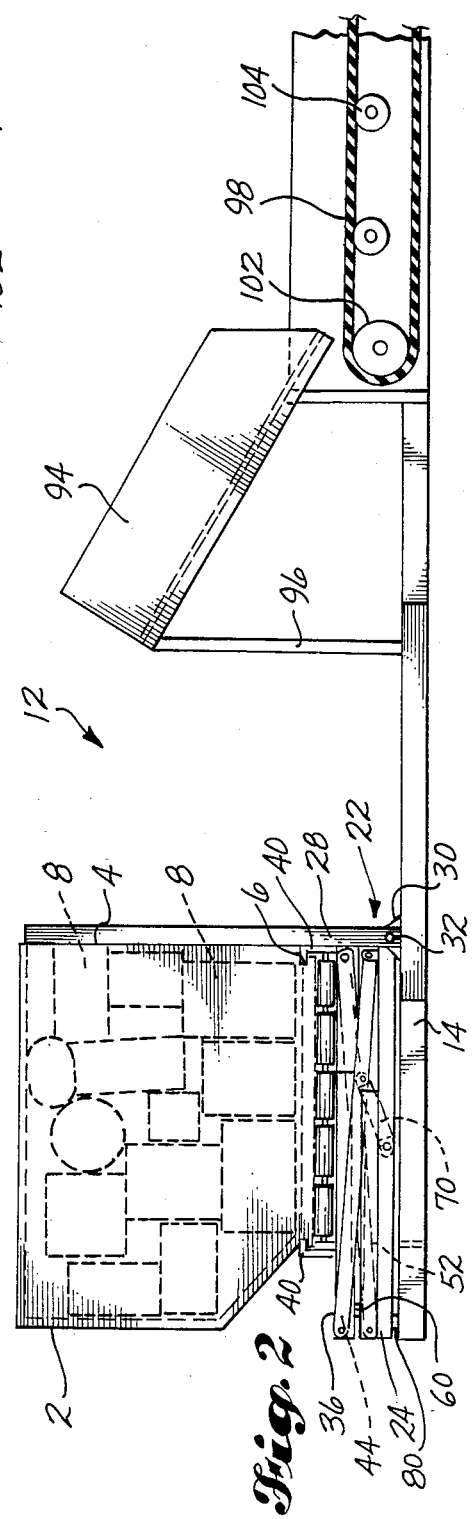

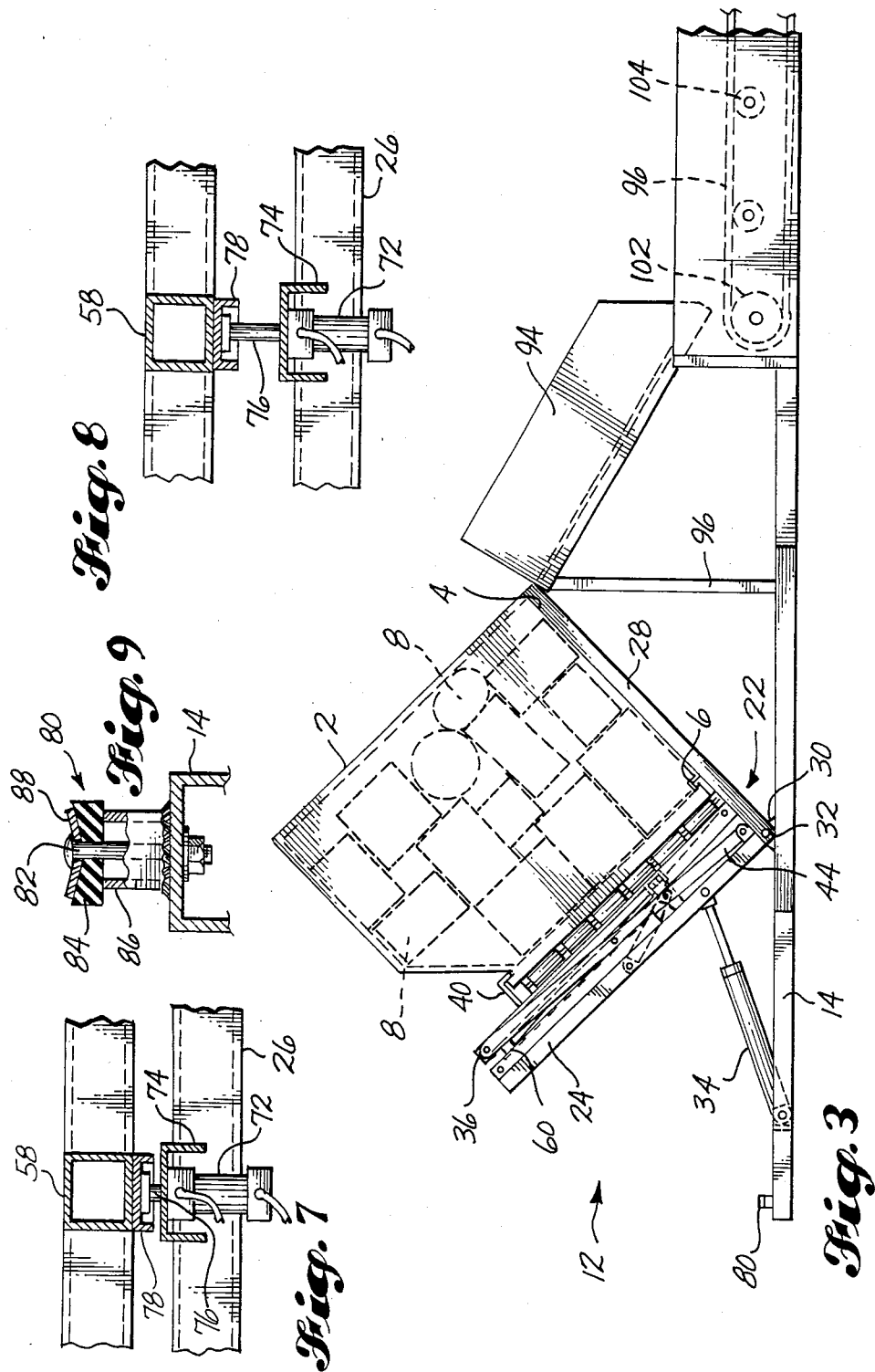

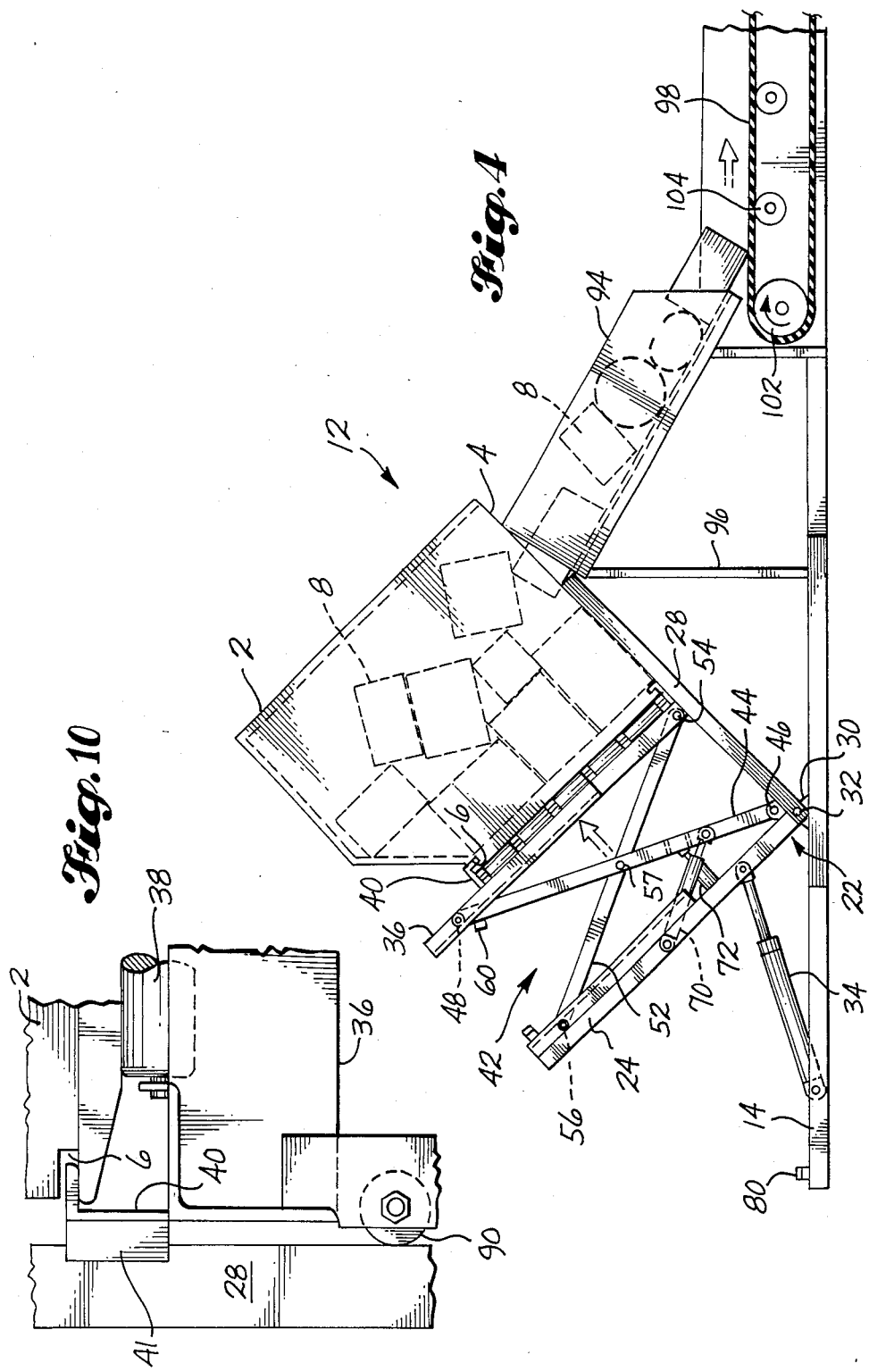

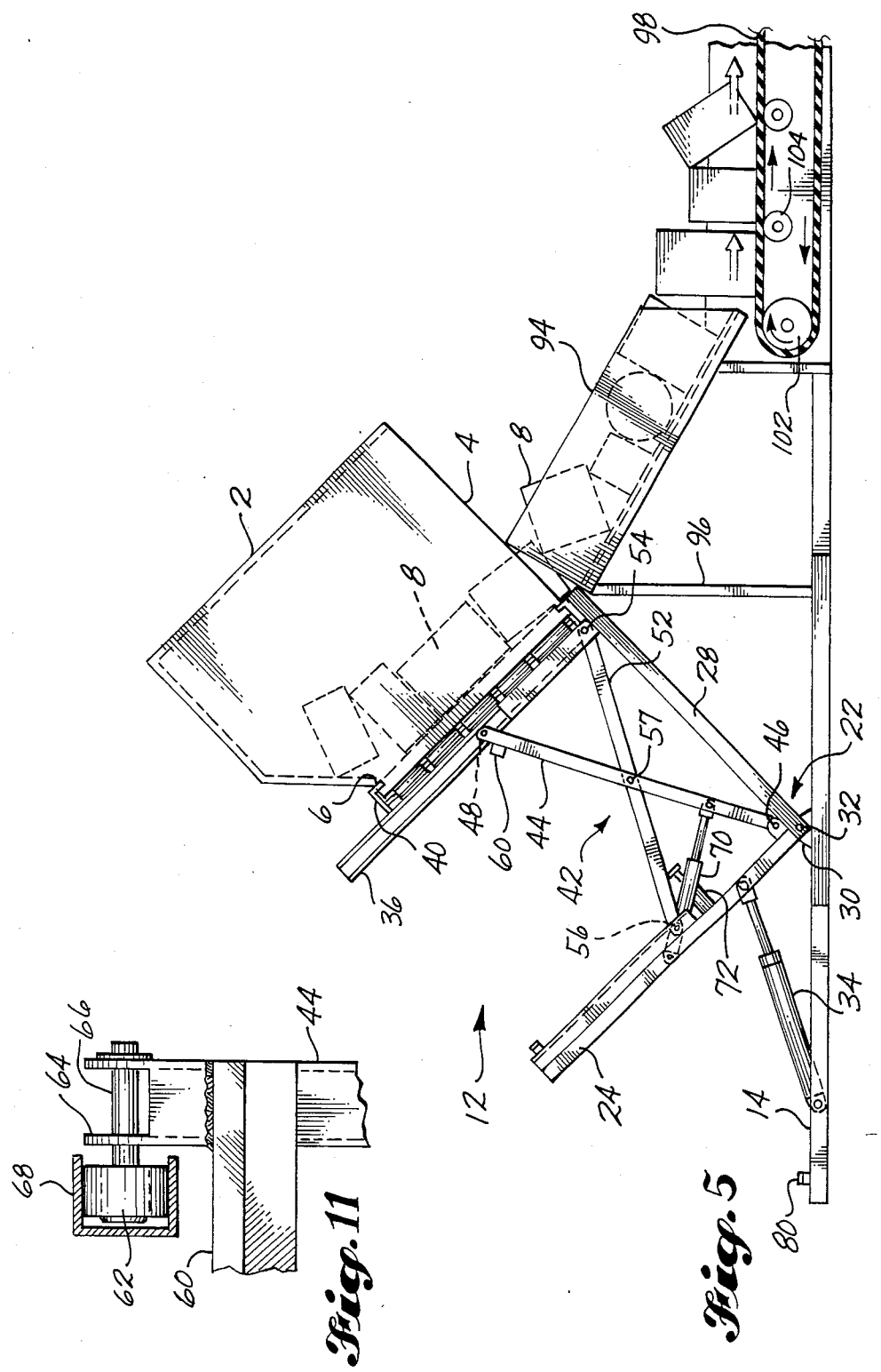

4,802,810

APPARATUS FOR UNLOADING CONTAINERS

DESCRIPTION

1. Technical Field

This invention relates to apparatus for unloading articles from containers and, more particularly, to such apparatus in which a table is mounted on the base of a frame having a perpendicular restraining wall; the frame, the table, and a container positioned on the table are pivotable into an inclined position; and scissor link raising means is disposed between the base and the table for raising the table and container relative to the frame to progressively uncover a side opening in the container.

2. Background Art

In the airline industry, passenger baggage is usually loaded into containers in the air terminal to consolidate the baggage and expedite its handling. The containers may be designed to have optimum sizes and shapes to make maximum use of the available space in particular types of aircraft cargo compartments. The loading of the baggage into containers also facilitates loading and off-loading baggage into and from aircraft cargo compartments. The containers are generally provided with means for facilitating their handling and positioning within the aircraft cargo compartment.

The current practice in the airline industry is to manually unload baggage from containers. Manual unloading is a labor intensive and time consuming process and a tedious, strenuous task for baggage handlers. The slowness of the process can cause departure delays when baggage must be transferred from one aircraft to another. Such delays can be costly. The high labor requirements of the process further increase the cost of baggage handling. Equipment for dumping containers and reducing the time and labor required for unloading is presently available. However, the equipment does not spread the baggage for further sorting and handles the baggage too roughly. Rough handling of the baggage can lead to damage to the baggage which even further increases the cost of handling.

U.S. Pat. No. 3,651,967, granted Mar. 28, 1972, to S. W. Rooke et al., discloses apparatus for unloading containers, such as luggage containers used in aircraft. The apparatus includes a tiltable cradle base onto which a container is pushed. When the container is in position on the cradle, it adjoins a fence which closes the open side of the container. The container, cradle, and fence are moved from an upright position into a tilted position. In one embodiment, the fence is then moved downwardly relative to the cradle and container by a rack and pinion mechanism. This progressively uncovers the open side of the container to allow baggage to slide down a chute attached to the fence onto a conveyor. In two other embodiments, a winch mechanism pulls the container and cradle upwardly along inclined guide rails. The movement of the container and cradle relative to the fence progressively uncovers the open side of the container to allow baggage to slide down a chute. The chute is attached either to the fence or to the inclined guide rails. U.S. Pat. No. 3,717,270, granted Feb. 20, 1973, to S. W. Rooke et al., issued on an application which was a continuation-in-part of the application on which U.S. Pat. No. 3,651,967 issued. It discloses an improvement comprising automatic means to control the conveyor speed in response to the presence or absence of baggage on the conveyor.

U.S. Pat. No. 3,863,781, granted Feb. 4, 1975, to N. W. Butzow et al., discloses apparatus for unloading articles, such as luggage, from containers while the containes are being conveyed through an unloading station. A container is placed on a dolly which is driven through the unloading station. A cam roller on a hinged upper surface of the dolly engages a cam surface to tilt the upper surface and the container thereon against retaining doors as the dolly and container move through the station. The doors tilt with the container. The tilted container and dolly continue past the doors and then past a discharge chute. As the dolly moves beyond the discharge chute, the cam surface returns the upper surface of the dolly and the container to an upright position as they exit the unloading station. U.S. Pat. No. 3,994,405, granted Nov. 30, 1976, to B. Krivec, discloses an improvement in the Butzow et al. apparatus relating to the hinge mechanism of the doors.

U.S. Pat. No. 3,602,383, granted Aug. 31, 1971, to G. Howat, discloses apparatus for unloading baggage from containers. The apparatus includes a channel which has a base and two restraining walls. A container loaded with baggage and having opposite open sides is positioned in the channel. The restraining walls of the channel cover the open sides of the container. The channel and the container are rocked into a tilted position in which one of the restraining walls rests on an adjacent downwardly sloping support surface. The baggage in the container settles on the restraining wall. The channel and container are then rocked back to an upright position, but the restraining wall remains in its inclined position on the downwardly sloping support. As the container rocks back to an upright position, the baggage is left behind and slides off the restraining wall onto a conveyor.

U.S. Pat. No. 3,695,462, granted Oct. 3, 1972, to N. M. Sullivan, discloses a computerized baggage handling system. The system uses a plurality of small containers, each of which holds the baggage of a single owner. The containers are delivered to a discharge station. At the station, the containers are tilted because the conveyor is inclined. Upon arrival at the station, the door of each container is opened to allow the baggage to slide out.

The above patents and the prior art cited therein should be carefully considered for the purpose of putting the prsent invention into proper perspective relative to the prior art.

DISCLOSURE OF THE INVENTION

The subject of the invention is apparatus for unloading articles from a container having a side opening. According to an aspect of the invention, the apparatus comprises a frame including a base and a restraining wall substantially perpendicular to the base. The wall is dimensioned to cover the container side opening. A table is mounted on and essentially parallel to the base and is dimensioned to receive the container thereon with the side opening adjacent to the restraining wall. Pivot means are provided for pivoting the frame and the table, with the container positioned thereon, from an initial position in which the base is substantially horizontal to an inclined position in which the side opening of the container faces generally downwardly. Raising means is disposed between the base and the table for raising the table and the container relative to the frame to progressively uncover the container side opening and allow gravity to cause articles in the container to move out through the opening. The apparatus also includes conveyor means positioned to receive the articles.

The raising means may take various forms. Preferably, the raising means comprises a scissor link having first and second members pivotably attached to the base and the table and to each other, and drive means for pivoting said members. In the preferred embodiment, each of the members of the scissor link has a first end pivotably and nontranslatably attached to one of the base and the table, a second end pivotably and translatably attached to the other of the base and the table, and a midportion pivotably attached to the other member. The drive means of the preferred embodiment comprises a piston/cylinder assembly with opposite ends pivotably attached to one of the members and the base, respectively.

A preferred feature of the invention is raising means which comprises a pair of such scissor links with the links being laterally spaced. A beam extends laterally between and is fixed to the links. The drive means comprises a piston/cylinder assembly associated with each link, and a helper cylinder assembly mounted on the base and having an extendible piston rod that engages the beam to assist the piston/cylinder assemblies in initiating raising of the table. The provision of the helper cylinder assembly allows the use of smaller piston/cylinder assemblies.

The pivot means preferably comprises means for pivotably attaching the frame to a fixed support positioned below the frame, and a piston/cylinder assembly with one end pivotably attached to the frame and an opposite end having means for pivotably attaching it to the fixed support. The conveyor means preferably comprises a chute having an upper end positioned to be substantially aligned with the top of the restraining wall when the frame is in its inclined position, and a lower end positioned above and adjacent to a powered conveyor.

The apparatus of the invention eliminates the need to unload baggage containers manually and thereby avoids the problems associated with manual loading discussed above. The apparatus of the invention may readily be incorporated into a fully automated system to maximize savings in labor and time and thereby maximize savings in the cost of handling baggage. The operation of the apparatus of the invention requires only minimum oversight by an operator. The use of the apparatus of the invention also avoids the problems of known equipment relating to piling up of baggage and rough handling. The apparatus of the invention provides a means for quickly and efficiently spreading baggage out onto a moving conveyor to expedite sorting. The operation of the apparatus does not subject the baggage to rough handling and therefore helps eliminate damage to baggage. The preferred arrangement and positioning of the pivot means and raising means minimizes the amount of space required for the apparatus and eliminates obstructions around the apparatus which could hinder the movement of or present a danger to personnel in the area. The overall structure of the apparatus of the invention is relatively simple and easy and inexpensive to manufacture and maintain.

These and other advantages and features will become apparent from the detailed description of the best mode for carrying out the invention that follows.

BRIEF DESCRIPTION OF THE DRAWINGS

In the drawings, like element designations refer to like parts throughout, and:

FIG. 1 is a top plan view of the preferred embodiment of the apparatus of the invention.

FIG. 2 is a side elevational view of the apparatus shown in FIG. 1 with a container positioned on the table.

FIG. 3 is like FIG. 2 except that it shows the frame, table, and container in an inclined position.

FIG. 4 is like FIG. 3 except that it shows the table and container raised part way up from the base of the frame.

FIG. 5 is like FIG. 4 except that it shows the table and container in a fully raised position.

FIG. 7 is a fragmentary side view of the helper cylinder in a retracted position, with parts shown in section.

FIG. 8 is like FIG. 7 except that it shows the cylinder in an extended position.

FIG. 9 is a sectional view of the vertical stop for the table, with parts shown in elevation.

FIG. 10 is an elevational view of the bearing between the table and the restraining wall.

FIG. 11 is an elevational view of one of the sliding connections of the scissor links, with the rail shown in section.

BEST MODE FOR CARRYING OUT THE INVENTION

Figure 6:
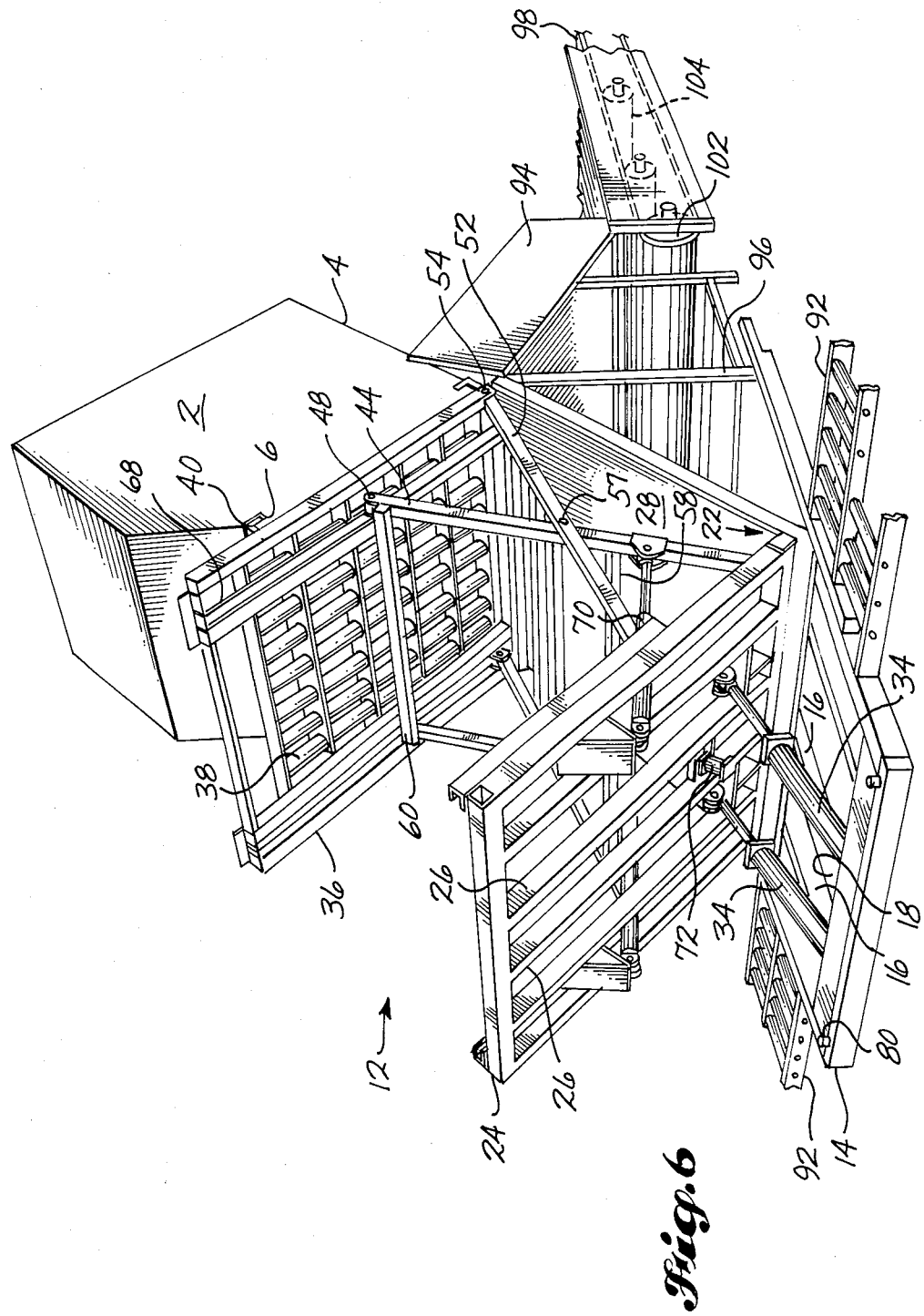
FIG. 6 is pictorial view of the apparatus shown in FIG. 5 looking at the rear and one side of the apparatus.

The drawings show unloading apparatus 12 that is constructed according to the invention and that also constitutes the best mode of the invention currently known to the applicant. In the drawings, the apparatus 12 is shown being used to unload a baggage container 2 of a type commonly used in the airline industry. The container 2 is shown for purposes of illustration. It is intended to be understood that the apparatus of the invention may also be used to advantage in connection with the unloading of other types of containers for baggage and other articles.

The container 2 is configured to conform to the shape of an aircraft cargo compartment in a known manner. The container 2 has an open side 4 through which the pieces of luggage 8 are loaded and unloaded. The opposite sides of the container 2 have horizontal slots 6 formed therein for receiving vertical restraint and guide members, such as the members 40 shown in FIGS. 1-6.

The preferred embodiment of the loading apparatus 12 shown in the drawings comprises a fixed support 14 which is anchored to the floor in the unloading area by suitable means (not shown). The support 14 has an open structure with forwardly extending support beams 16. The spaces 18 between the beams 16 receive pivot cylinders 34, described below.

The unloading apparatus 12 also includes a frame 22 which is pivotably attached to the fixed support 14. The frame 22 includes a base 24 and a restraining wall 28 which is essentially perpendicular to base 24. When the frame 22 is in the rest position shown in FIG. 2, the base 24 is essentially horizontal and the restraining wall 28 is essentially vertical. The base 24 has an open structure, similar to the structure of the fixed support 14, with forwardly extending beams 26. The frame 22 is pivotably attached to the support 14 by means of two laterally spaced pivot brackets 30 and corresponding pivot pins 32. The frame 22 is pivoted relative to the support 14 by means of a pair of laterally spaced piston/cylinder assemblies 34, each of which has one end pivotably attached to the frame 22 and an opposite end pivotably attached to the fixed support 14. The assemblies 34 are positioned between the base 24 and the support 14 so that they fold out of the way when the apparatus 12 is in the rest position shown in FIG. 2.

A roller table 36 is mounted on and essentially parallel to the base 24 of the frame 22. The table 36 carries a plurality of rollers 38 to facilitate the moving of a container 2 onto and off from the table 36. Two vertical restraint and guide members 40 are mounted on the table 36 for engaging the slots 6 in the container 2 to guide the container 2 into position on the table 36 and restrain the container 2 vertically. Each member 40 preferably has an extension 41 at each of its ends which extends forwardly and laterally outwardly to provide a cam surface for aiding the positioning of the container 2. See FIG. 10. Also preferably, means, such as hydraulic cylinders (not shown), are provided for moving the rear restraint and guide member 40 forwardly and rearwardly to adjust the distance between the two restraint and guide members 40 to accommodate different types and/or sizes of containers.

The unloading apparatus 12 is provided with means disposed between the base 24 of the frame 22 and the table 36 for raising the table 36 and a container 2 positioned on the table 36 relative to the frame 22. Preferably, the raising means comprises a pair of laterally spaced scissor links 42 each of which has a first member 44 and a second member 52 pivotably attached to the base 24 and the table 36 and to each other. As shown in the drawings, the first member 44 of each scissor link 42 has a first end which is pivotably and nontranslatably connected to the base 24 by means of a pivot connection 46. The second end of the member 44 is pivotably and slidably connected to the table 36 by means of a sliding connection 48. The second member 52 has a pivotable and nontranslatable connection 54 to the table 36 and a pivotable and translatable sliding connection 56 to the base 24. The midportions of the two members 44, 52 are pivotably connected together by means of a pivot pin 57. The first members 44 of the two scissor links 42 are connected to each other by a horizontal cross beam 58. The beam 58 extends laterally between the members 44 and is fixed to each member 44 between the midpoint pivot connection 57 and the lower pivot connection 46 to the base 24.

The sliding connections 48, 56 can best be seen in FIGS. 6 and 11. Each of the connections 48, 56 is essentially identical. FIG. 11 is a detail of the sliding connection 48 of the first member 44 of one of the scissor links 42. A yoke 64 is formed on the end of the member 44. A roller 62 is mounted on the end of the member 44 by means of a pivot shaft 66 which is received through the yoke 64 in a known manner. The roller 62 is received into the channel formed by a rail 68 carried by the table 36. A tie bar 60 is secured to the member 44 adjacent to the yoked end and extends horizontally to and is secured to the first member 44 of the other scissor link 42. The tie bar 60 helps ensure that the rollers 62 remain in their respective rails 68.

The raising means of the preferred embodiment also includes drive means for pivoting the members 44, 52 of the scissor links 42. The drive means includes two main piston/cylinder assemblies 70, one associated with each scissor link 42. Each assembly 70 has opposite ends that are pivotably attached to the corresponding first member 44 and the base 24 of the frame 22, respectively. The drive means also includes a helper cylinder assembly 72 as shown in FIGS. 4-8. The details of the assembly 72 can be seen in FIGS. 7 and 8. The assembly 72 is mounted on the base 24 by means of a mounting bracket 74. The assembly 72 has an extendible/retractable piston rod 76 which engages a midportion of the cross beam 58 that connects the two scissor links 42. The enlarged end of the piston rod 76 is received into a generally cup-shaped member 78 secured to the cross beam 58.

The apparatus 12 includes stop means for limiting movement of the apparatus when it is moved back into its rest position shown in FIG. 2. The stop means includes the tie bar 60 that connects the first members 44 of the scissor links 42 adjacent to their sliding connections 48. The bar 60 engages the base 24 when the scissor links 42 are returned to their folded position, shown in FIG. 2, to limit movement of the table 36 toward the base 24. The stop means also includes two stop members 80 positioned on the rear corners of the rear end of the fixed support 14. The stop members 80 provide a cushioned stop for the frame 22 when it is pivoted back toward its rest position shown in FIG. 2. The details of the structure of the stop members 80 are shown in FIG. 9. Each member 80 includes a bolt 82 which is slidably attached to the support 14. A resilient cushion 84 and a washer 88 are positioned between the head of the bolt 82 and an annular sleeve 86 which surrounds the shaft of the bolt 82. The cushion 84 absorbs the force of the base 24 contacting the stop 80.

Each of the two forward corners of the table 36 is preferably provided with a bearing roller 90, as shown in FIG. 10. Each roller 90 projects slightly forwardly from the forward end of the table 36 to engage the smooth rear surface of the restraining wall 28. The rollers 90 help prevent binding of the table 36 against the restraining wall 28, smooth the motion of the table 36 when it is raised and lowered, and greatly reduce noise associated with raising the lowering of the table 36.

The apparatus of the invention includes conveyor means positioned to receive pieces of luggage 8 discharged from a container 2. As shown in FIGS. 1-6, the preferred embodiment of the conveyor means includes chute 94 and an endless belt conveyor 98. The upper rear end of the chute 94 is positioned by support posts 96 to be substantially aligned with the top of the restraining wall 28 when the frame 22 is in its inclined position shown in FIGS. 3-6. In the preferred embodiment, the top of the restraining wall 28 contacts the upper end of the chute 94. The lower end of the chute 94 is positioned above and adjacent to the end of the conveyor 98. The conveyor 98 is preferably provided with power rollers 102 and guide rollers 104.

The operation of the apparatus 12 is as follows. With the frame 22 and table 36 in the rest position shown in FIG. 2, a container 2 is pushed onto the table 36. A roller conveyor 92 is positioned on each side of the fixed support 14 to expedite the moving of the container 2 onto the table 36. See FIGS. 1 and 6. When the container 2 is positioned on the table 36, the side opening 4 is closely adjacent to and covered by the restraining wall 28. The restraining wall 28 is dimensioned to cover the opening 4, and the table 36 is dimensioned to accommodate the base of the container 2.

When the container 2 is in position on the table 36, as shown in FIG. 2, the piston/cylinder assemblies 34 are extended to pivot the frame 22, table 36, and container 2 approximately 45° into the inclined position shown in FIG. 3 in which the opening 4 faces generally downwardly. The baggage 8 slides down into contact with the restraining wall 28. Then, the piston/cylinder assemblies 70 and the helper cylinder assembly 72 are operated to initiate the raising of the table 36 and the container 2 relative to the frame 22. As can be seen in FIGS. 4 and 5, the upward movement of the table 36 and container 2 progressively uncovers the opening 4 in the container 2 to allow gravity to cause pieces of luggage 8 in the container 2 to move out through the opening 4 and onto the chute 94. The luggage 8 slides down the chute 94 and onto the moving conveyor 98, as shown in FIGS. 4 and 5. As the table 36 moves upwardly, the baggage 8 slides along the adjacent face of the restraining wall 28. The smoothness of the face prevents damage to or marring of the baggage 8.

The helper cylinder 72 assists the main piston/cylinder assemblies 70 in initiating upward movement of the table 36 and the container 2. When the table 36 has reached approximately the position shown in FIG. 4, the helper cylinder 72 is no longer needed to continue raising the table 36 into its fully raised position shown in FIG. 5. Therefore, at about the point shown in FIG. 4, the piston rod 76 of the helper cylinder 72 no longer extends and the member 44 of the scissor link 42 moves out of contact with the piston rod 76, as shown in FIG. 5.

When all of the luggage 8 has moved out of the container 2, the raising and pivoting procedures are reversed to return the apparatus 12 into the position shown in FIG. 2. The apparatus 12 is then ready for receiving another container 2.

It will be obvious to those skilled in the art to which this invention is addressed that the invention may be used to advantage in a variety of situations. Therefore, it is also intended to be understood by those skilled in the art that various modifications and omissions in form and detail may be made without departing from the spirit and scope of the invention as defined by the following claims.

What is claimed is:

1. Apparatus for unloading articles from a container having a side opening, comprising;
    a frame including a base and a restraining wall substantially perpendicular to the base; said wall being dimensioned to cover said opening;
    a table mounted on and essentially parallel to the base and dimensioned to receive said container thereon with said opening adjacent to said wall;
    pivot means for pivoting the frame and the table, with said container positioned thereon, from an initial position in which the base is substantially horizontal to an inclined position in which said opening faces generally downwardly;
    raising means disposed between the base and the table for raising the table and said container relative to the frame, following pivoting of the frame and the table to said inclined position, to progressively uncover said opening and allow gravity to cause articles in the container to move out through said opening; and
    conveyor means positioned to receive said articles.

2. Apparatus as described in claim 1, in which the raising means comprises a scissor link having first and second members pivotably attached to the base and the table and to each other, and drive means for pivoting said members.

3. Apparatus as described in claim 1, in which the raising means comprises:
    a scissor link including first and second members; each of said members having a first end pivotably and nontranslatably attached to one of the base and the table, a second end pivotably and translatably attached to the other of the base and the table, and a midportion pivotably attached to the other member; and
    drive means for pivoting said members, said drive means comprising a piston/cylinder assembly with opposite ends pivotably attached to one of said members and the base, respectively.

4. Apparatus as described in claim 3, in which the raising means comprises a pair of said scissor links, said links being laterally spaced, and a beam that extends laterally between said links and is fixed to said member of each of said links having an end pivotably and nontranslatably attached to the base between said midportion and said pivotably and nontranslatably attached end; and the drive means comprises a piston/cylinder assembly associated with each link, and a helper cylinder assembly mounted on the base and having an extendible piston rod that engages the beam to assist the piston/cylinder assemblies in initiating raising of the table.

5. Apparatus as described in claim 1, in which the pivot means comprises means for pivotably attaching the frame to a fixed support positioned below the frame; and a piston/cylinder assembly with one end pivotably attached to the frame, and an opposite end positioned below the frame when the frame is in said initial position and having means for pivotably attaching it to the fixed support.

6. Apparatus as described in claim 2, in which the pivot means comprises means for pivotably attaching the frame to a fixed support positioned below the frame; and a piston/cylinder assembly with one end pivotably attached to the frame, and an opposite end positioned below the frame when the frame is in said initial position and having means for pivotably attaching it to the fixed support.

7. Apparatus as described in claim 3, in which the pivot means comprises means for pivotably attaching the frame to a fixed support positioned below the frame; and a piston/cylinder assembly with one end pivotably attached to the frame, and an opposite end positioned below the frame when the frame is in said initial position and having means for pivotably attaching it to the fixed support.

8. Apparatus as described in claim 4, in which the pivot means comprises means for pivotably attaching the frame to a fixed support positioned below the frame; and a piston/cylinder assembly with one end pivotably attached to the frame, and an opposite end positioned below the frame when the frame is in said initial position and having means for pivotably attaching it to the fixed support.

9. Apparatus as described in claim 1, in which the conveyor means comprises a chute having an upper end positioned to be substantially aligned with the top of the restraining wall when the frame is in said inclined position, and a lower end positioned above and adjacent to a powered conveyor.

10. Apparatus as described in claim 3, in which said one of said members has an end pivotably and nontranslatably attached to the base, and one of said ends of the drive means is attached to said one of said members between said midportion and said pivotably and nontranslatably attached end.

11. Apparatus as described in claim 10, in which the raising means comprises a pair of said scissor links, said links being laterally spaced, and a beam that extends laterally between said links and is fixed to said one of said members of each of said links between said midportion and said pivotably and nontranslatably attached end; and the drive means comprises a piston/cylinder assembly associated with each link, and a helper cylinder assembly mounted on the base and having an extendible piston rod that engages the beam to assist the piston/cylinder assemblies in initiating raising of the table.

12. Apparatus as described in claim 10, in which the pivot means comprises means for pivotably attaching the frame to a fixed support positioned below the frame; and a piston/cylinder assembly with one end pivotably attached to the frame, and an opposite end positioned below the frame when the frame is in said initial position and having means for pivotably attaching it to the fixed support.

13. Apparatus as described in claim 11, in which the pivot means comprises means for pivotably attaching the frame to a fixed support positioned below the frame; and a piston/cylinder assembly with one end pivotably attached to the frame, and an opposite end positioned below the frame when the frame is in said initial position and having means for pivotably attaching it to the fixed support.

14. Apparatus as described in claim 2, in which the raising means comprises a pair of laterally spaced scissor links, each said link including first and second members, said first member having a first end pivotably and nontranslatably attached to the base and a second end pivotably and translatably attached to the table, and said second member having opposite ends pivotably and translatably attached to the base and pivotably and nontranslatably attached to the table, respectively; and drive means for pivoting said members; in which the table has opposite laterally directed channels, and each said second end carries a roller that is received into one of the channels to pivotably and translatably attach said second end to the table; and which further comprises a tie bar extending laterally between and fixed to said first members adjacent to said second ends, to maintain the rollers in the channels; said tie bar being positioned to engage the base, when the table is moved toward the base, to limit movement of the table toward the base.

15. Apparatus as described in claim 14, in which the drive means comprises a piston/cylinder assembly associated with each link and having opposite ends pivotably attached to one of said members of the associated link and the base, respectively.

16. Apparatus as described in claim 15, in which said members in each of said links have midportions pivotably attached to each other; the raising means further comprises a beam that extends laterally between and is fixed to said first members between said midportions and said first ends; and the drive means further comprises a helper cylinder assembly mounted on the base and having an extendible piston rod that engages the beam to assist the piston/cylinder assemblies in initiating raising of the table.

17. Apparatus as described in claim 15, in which said members in each of said links have midportions pivotably attached to each other, and each piston/cylinder assembly is pivotably attached to said first member of the associated link between said midportion and said first end.

18. Apparatus as described in claim 16, in which each piston/cylinder assembly is pivotably attached to said first member of the associated link between said midportion and said first end.

19. Apparatus as described in claim 14, in which the pivot means comprises means for pivotably attaching the frame to a fixed support positioned below the frame; and a piston/cylinder assembly with one end pivotably attached to the frame, and an opposite end positioned below the frame when the frame is in said initial position and having means for pivotably attaching it to the fixed support.

* * * * *